US005451740A

United States Patent [19]

Hanus et al.

[11] Patent Number: 5,451,740

[45] Date of Patent: * Sep. 19, 1995

[54] CONVERTIBLE PLASMA ARC TORCH AND METHOD OF USE

[75] Inventors: Gary J. Hanus, Edina; Todd J. Stahl, Golden Valley, both of Minn.; Salvador L. Camacho, Raleigh, N.C.

[73] Assignee: FluiDyne Engineering Corporation, Minneapolis, Minn.

[*] Notice: The portion of the term of this patent subsequent to Nov. 8, 2011 has been disclaimed.

[21] Appl. No.: 335,038

[22] Filed: Nov. 7, 1994

Related U.S. Application Data

[63] Continuation of Ser. No. 160,471, Dec. 1, 1993, Pat. No. 5,362,939.

[51] Int. Cl.$^{6}$ .............................................. B23K 10/00

[52] U.S. Cl. .......................... 219/121.59; 219/121.52; 219/121.49; 219/75; 219/121.48

[58] Field of Search ...................... 219/121.59, 121.49, 219/121.48, 121.52, 74, 75, 121.39; 313/231.21, 231.31

[56] References Cited

U.S. PATENT DOCUMENTS

| | | | |
|---|---|---|---|
| 3,818,174 | 6/1974 | Camacho | 219/121.5 |
| 4,559,439 | 12/1985 | Camacho et al. | 219/121.48 |
| 4,814,577 | 3/1989 | Dallavalle et al. | 219/121.57 |

*Primary Examiner*—Mark H. Paschall
*Attorney, Agent, or Firm*—Olive & Olive

[57] ABSTRACT

A plasma arc torch is provided which is convertible in the field as to be able to operate in either a transfer arc mode or non-transfer arc mode. The plasma arc torch comprises a torch body having channels formed for flow of coolant and plasma gas therein. The torch body further comprises an anode and a cathode base and terminates at a threaded connection point. Adapted to be assembled to the threaded connection by means of mating threads is, alternatively, either an end cap or a cathode extension assembly, thereby establishing a plasma arc torch capable of operating in either a transfer arc mode or a non-transfer arc mode. When the end cap is connected, the cathode base is not energized. The cathode extension assembly contains a cathode extension which connects to the cathode base on assembly. Both the cathode base and cathode extension are energized to form the active cathode for the non-transfer arc mode operation.

2 Claims, 6 Drawing Sheets

CONVERTIBLE PLASMA ARC TORCH AND METHOD OF USE

This application is a continuation of pending application Ser. No. 08,160,471 filed Dec. 1, 1993, to be issued as U.S. Pat. No. 5,362,939 on Nov. 8, 1994.

FIELD OF THE INVENTION

The present invention relates to the field of plasma arc torches, and more particularly to a plasma arc torch which may be converted to operate in either a transfer arc operating mode or a non-transfer arc operating mode.

BACKGROUND OF THE INVENTION

Plasma arc torches as known in the prior art are capable of efficiently converting electrical energy to neat energy at very high levels of temperature. It is not uncommon for a plasma arc torch to operate in a range of 6000°–7000° C.

Plasma arc torches are typically of two types, one of which can be operated in a transfer arc mode and the other of which can be operated in a non-transfer arc mode. In the transfer arc mode, the electric arc jumps from a first electrical terminal on the torch to a second terminal which is essentially the workpiece, i.e. the arc connects, or transfers to, the workpiece. In the non-transfer arc mode, the arc jumps from a first terminal on the torch to a second terminal which is also on the torch, thereby not transferring from the torch.

Prior art plasma arc torches are typically made to operate in either a transfer configuration or a non-transfer configuration. More recently, a convertible torch has been described in U.S. Pat. No. 4,549,065 to Camacho et al. entitled Plasma Generator and Method and more specifically in U.S. Pat. No. 4,559,439 to Camacho et al. entitled Field Convertible Plasma Generator and its Method of Operation, the teachings of both of which patents are incorporated herein by reference. The '439 patent describes a torch having mounting means adapted to threadably mount either an electrode assembly for operation in the non-transfer mode or a collimating nozzle assembly for operation in the transfer mode.

The convertible plasma torch of the '439 patent requires that the entire front electrode assembly be removed and replaced by the collimating nozzle assembly when the torch is being converted from a non-transfer to a transfer mode. The present invention recognizes that significant advantages would accrue if certain of the components making up the front electrode assembly could be used as part of the collimating nozzle assembly. Thus, an object of the present invention is to provide an improved convertible plasma torch in which certain components making up the front electrode assembly can be used as part of a collimating nozzle assembly.

In another aspect of the prior art evolving from the cup shape front electrode as illustrated in the '439 patent, it has been observed that such cup shape geometry promotes the arc attachment in such manner that erosion of the front electrode takes place primarily in the cup region. Thus, another object of the present invention is to design the internal shape of the front electrode in such a manner that the wear pattern will automatically create an expansion region that promotes a natural axial erosion of the electrode.

The invention disclosed by the description and the drawings to follow relates to an additional and novel apparatus and method for simply converting a plasma arc torch from one mode of operation to the other.

SUMMARY OF THE INVENTION

The invention disclosed provides a plasma arc torch which is capable of being converted in the field. In its fundamental form, the plasma arc torch of the invention is a transfer arc mode operating torch which has an end cap adapted to pass the plasma gas and arc out through a central bore and to channel the flow of a coolant material through internal passages. To accomplish the change in the form of the plasma arc torch from the transfer arc mode to the non-transfer arc mode, the end cap is removed from the torch body and replaced with a cathode extension assembly which extends the central bore as a collimating tube for plasma and arc transmission and joins to the existing coolant lines so that the coolant flows through the cathode extension assembly as well as the body of the torch. A face portion of the cathode extension assembly functions as a first electrical terminal to connect the arc in a non-transfer arc mode. Certain components of the plasma torch are used in both modes of operation and steps are taken in the design to facilitate a natural, axial erosion of the rear electrode. Internal electrical connections are also changed to accommodate the modified electrical path.

DESCRIPTION OF THE PREFERRED EMBODIMENT

To better understand the description to follow, it is to be noted that a plasma arc torch is generally configured as a circular cylindrical assembly of tubular and annular parts having multiple channels for coolant flow and transmission of plasma gas. Means are also provided for establishing an electric arc which is supported by a column of the gas. Since the plasma torch of the present invention, except for its novel features as later described, generally follows the type of construction described in the previously mentioned U.S. Pat. No. 4,559,439, reference may be had to the '439 patent for background necessary to understand the description to follow.

Figures 1, 2, 3, 4:
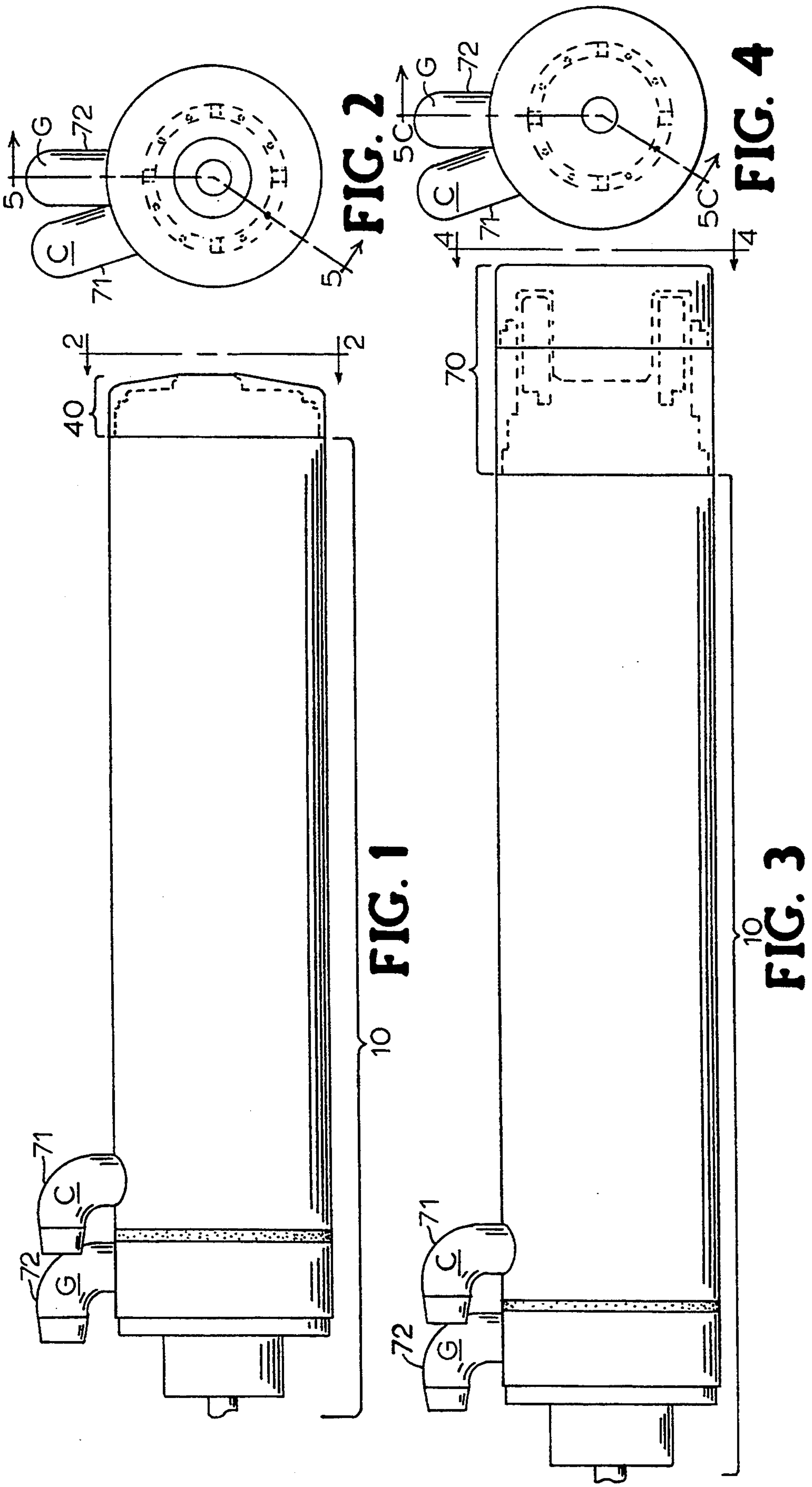
FIG. 1 is a side elevation view of the plasma arc torch of the invention configured in the transfer mode and illustrating the removable end cap.
FIG. 2 is an end elevation view of the plasma arc torch of FIG. 1 snowing an internal detail (in dashed lines) and taken in the direction of line 2—2 of FIG. 1.
FIG. 3 is a side elevation view of the plasma arc torch of the invention converted into the non-transfer mode and illustrating use of a cathode extension assembly.
FIG. 4 is an end elevation view of the plasma arc torch of FIG. 3 snowing an internal detail (in dashed lines) and taken in the direction of line 4—4 of FIG. 1.

Referring now to the drawings, FIG. 1 shows an exterior side elevation of a plasma torch of the invention assembled for operation in the transfer arc mode. Main body 10 is configured as an elongate circular cylinder with a pair of right angle supply ports 71 and 72 mounted thereon for coolant water C and plasma gas G supply respectively. At the opposite extremity, the later described torch end cap 40 is mounted on torch body 10 by being screwed onto a mating threaded portion thereof.

FIG. 2 shows an end view of the torch of FIG. 1. An annular ring having a series of four radially disposed channels and eight longitudinally oriented holes is illustrated in dashed lines. The annular ring section shown in dashed lines in FIG. 2 corresponds to the cross section of FIG. 8.

FIGS. 3 and 4 are respectively similar views of a non-transfer arc mode configuration of the invention with a second type torch head, cathode extension assembly 70 attached to torch body 10. An annular ring similar to that shown in FIG. 2 in dashed lines is also illustrated in dashed lines in FIG. 4.

Figure 5A:
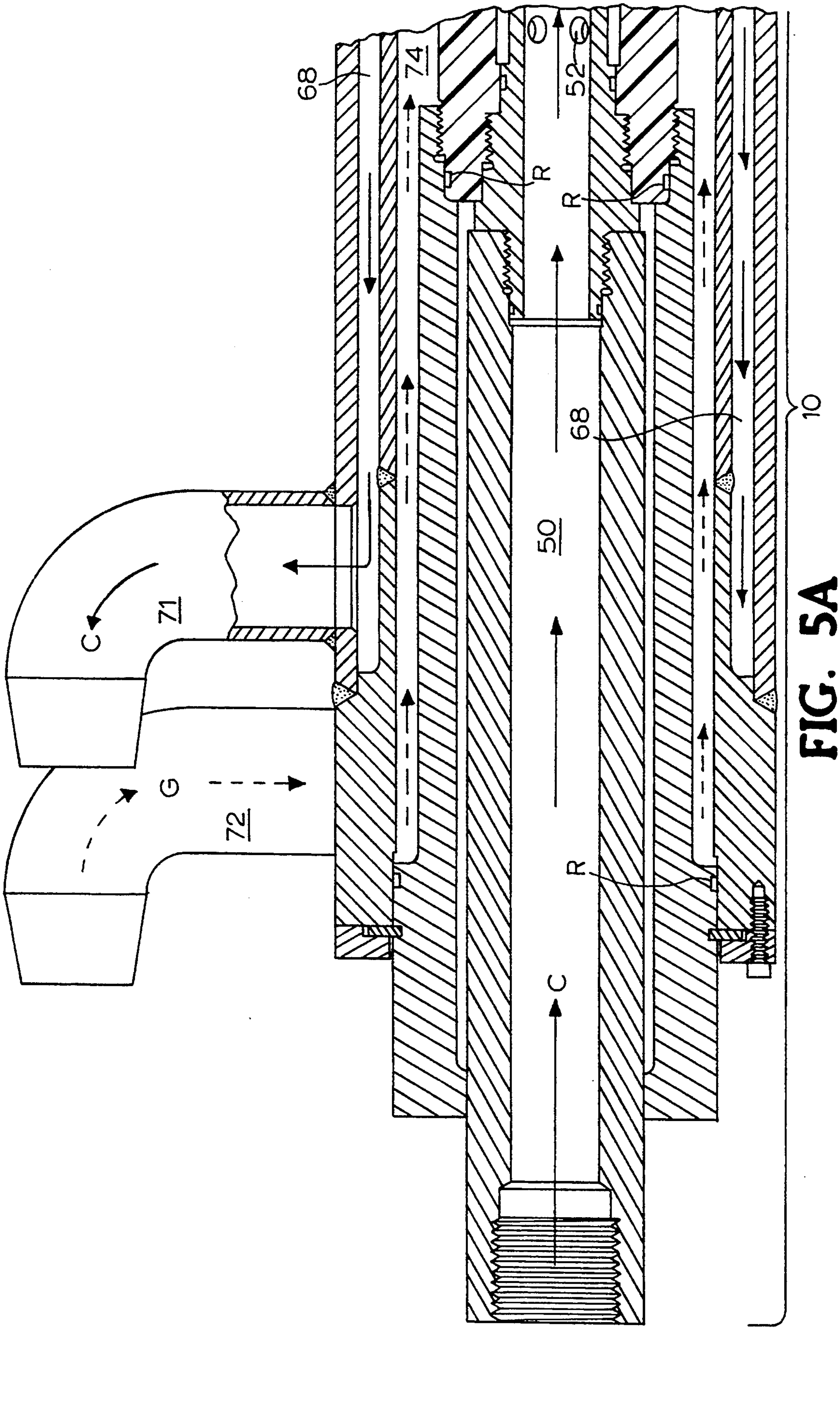
FIG. 5A is a cross sectional view of the rear portion of the plasma torch taken in the direction of angled line 5—5 of FIG. 2.
Figure 5B:
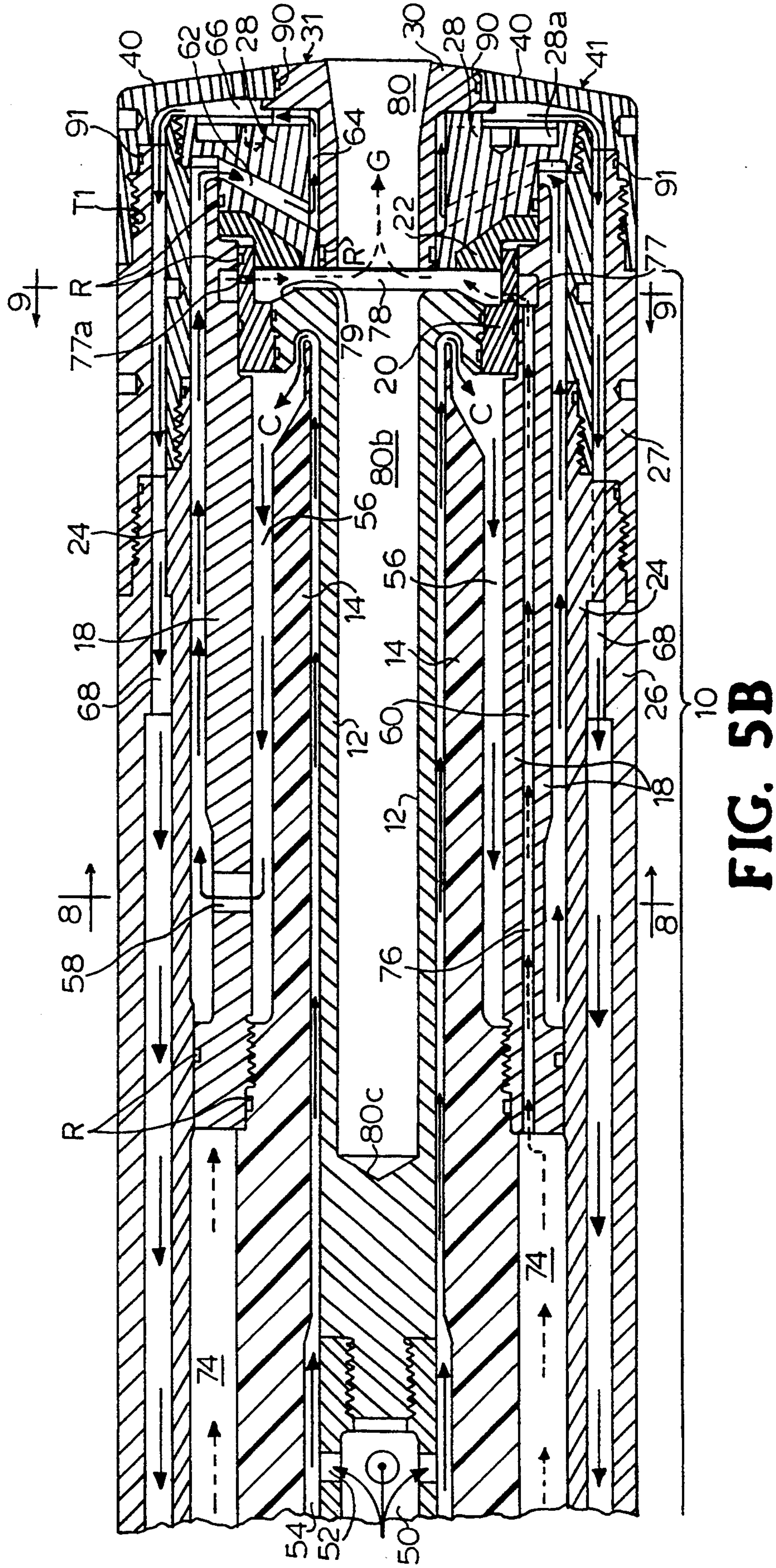
FIG. 5B is a cross sectional view of the front portion of the plasma torch taken in the direction of angled line 5—5 of FIG. 2 as it appears when operative in the transfer arc mode and with the end cap of FIG. 6 installed.

According to the present invention, the assembled torch body and head may be adapted to operate in either a transfer or a non-transfer arc mode. FIGS. 5A and 5B show the plasma arc torch of the invention, divided for drawing space into two sections, with end cap 40 mounted at the plasma arc discharge end (right side of FIG. 5B) to establish the torch configuration for the transfer arc mode. Plasma torch body 10 is fitted with conventional apparatus, not shown, for receiving and utilizing the plasma gas, electric power and coolant. Plasma gas is caused to flow along a later described path along a portion of which the plasma gas generates a swirling pattern through the chamber 78 between vortex generator 20 and gap insulator 22 and exits through bore 80. Anode 12 comprises the rear electrode and is connected to a first, typically positive, electrical terminal, not shown. The first, typically negative electrode comprises an appropriately electrically connected external workpiece when the torch is operating in a transfer arc mode. A tubular base member which is used in both modes comprises cathode base 30. Cathode base 30, typically made of copper, is however not electrically connected and acts primarily as a collimating device when the torch is operating in the transfer mode. Once a flow of plasma gas has been established, electric power is applied and the resulting electric arc follows the plasma gas flow from anode 12, i.e. the rear electrode, to the external workpiece, which effectively serves as a front electrode, creating an intensely hot, high energy plasma flame. As will be apparent from the drawings, anode 12, typically made of copper, comprises a tubular member having a closed rear end and an open forward end.

The extremely high heat generated by the referred to plasma arc flame requires continuous circulation of coolant through the body of the plasma arc torch. The general flow of coolant C, such as, for example, water, follows a pattern according to arrows C in the tubular main channels and drilled axial and radial passages from the rear entry of coolant C (see FIG. 5A) through the torch body 10 and back to a rear exit through pipe 71.

Figure 5C:
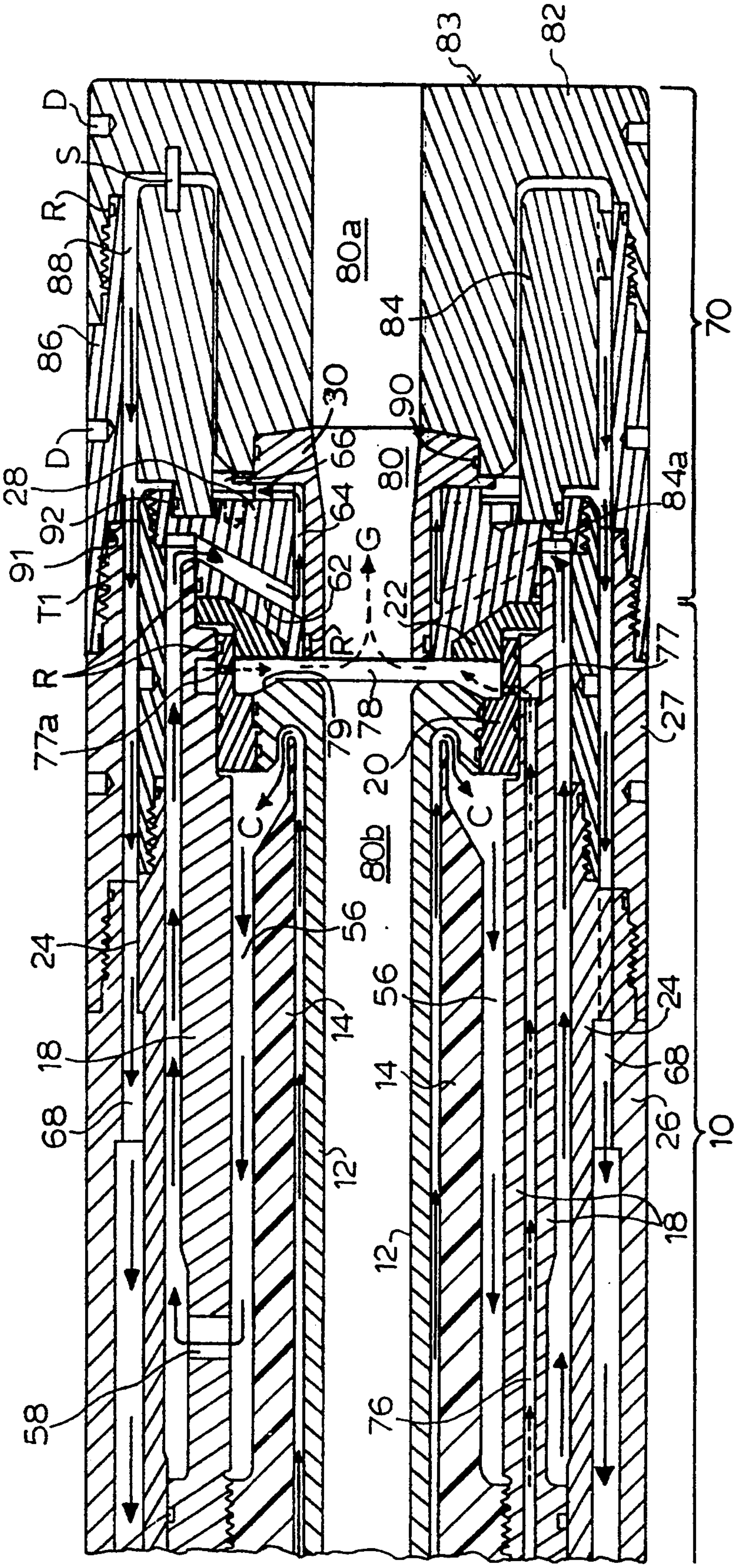
FIG. 5C is a cross sectional view of the front portion of the plasma torch taken in the direction of line 5C—5C of FIG. 4 as it appears when operative in the non-transfer arc mode with the cathode extension assembly of FIG. 7 installed.

It is to be noted as illustrated in FIGS. 5A, 5B, and 5C, for example, that all components of the torch are substantially either tubular or annular and are typically connected to each other by screw threaded joints and O-ring seals. The coolant distribution system is effectively divided into three operative systems: the first includes coolant flow through torch body 10; the second includes coolant flow through end cap 40, when mounted; and the third includes extension assembly 70, but not end cap 40, when so mounted.

Coolant water C, illustrated as following solid line arrows, enters through bore 50, as seen in FIG. 5A, passes through radial apertures 52 (FIG. 5A and 5B) and follows channel 54 between anode 12 and anode liner 14 at the end of which coolant C changes direction and follows channel 56 between anode liner 14 and barrier 18. The coolant water C again reverses direction after passing through radial apertures 58 and moves toward the arc discharge end of torch body 10 through a channel 60 between barrier 18 and liner 24. At the discharge end of channel 60, cathode base flow guide 28 blocks the flow of coolant C and causes a change in direction angularly and radially toward the center of the torch body 10 through a series of angular passages 62 drilled through cathode base flow guide 28 in various radial positions. Coolant C next enters a channel 64 between cathode base flow guide 28 and cathode base 30.

At this point, coolant C is forced to flow radially away from the center of torch body 10 in passages 66 between cathode base flow guide 28 and end cap 40. As will be seen, with end cap 40 screwed in place, the coolant C flow is directed past housing adapter 27 through passages 68 between liner 24 and shell 26 rearwardly, away from the arc discharge end of plasma torch body 10 to be discharged through outlet pipe 71. Housing adapter 27 is provided as a separate, annular metal formed part to be replaceable and thus compensates for the severe service wear which occurs due to the heat involved. The later described end cap 40 is assembled to torch body 10 and housing adapter 27 by threaded connections T1 and sealed by means of O-rings 90 and 91.

A second flow pattern depicted in FIGS. 5A and 5B is that of the plasma gas G, flowing through a plurality of passages and vortex generator 20 to reach central bore 80 within which the arc flame is established in a column of gas G. Central bore 80 is flared to an increased diameter at the arc discharge end in cathode base 30 so as to reduce the gas flow velocity which, it has been found, enhances heat transfer to the workpiece in the transfer arc mode.

The flow path of plasma gas G, depicted in dashed lines, extends from entry 72, shown in FIG. 5A, through channel 74, through passages 76 (FIG. 5B) and into chamber 78 by way of skewed holes 77 and 77*a* (see FIG. 9) through vortex generator 20 to then swirl into central bore 80 and there surround an electric arc originating at anode 12 and extending outwardly to an electrically connected cathode terminal beyond the torch on a workpiece to be heated. Therefore, cathode base 30 is not electrically operative in this transfer arc mode.

Figure 9:
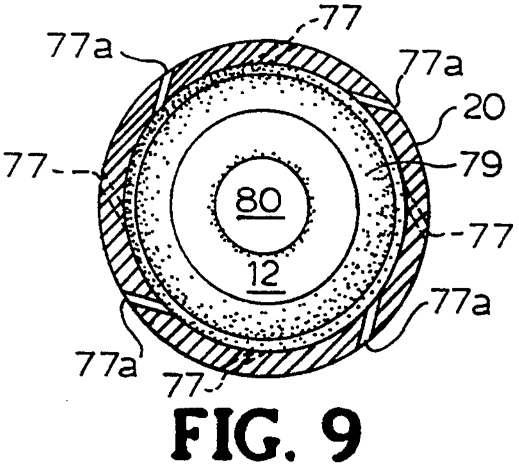
FIG. 9 is a cross section view taken through the vortex generator in the direction of line 9—9 of FIG. 5B and illustrating a series of tangential alternatingly offset gas transmitting apertures.

FIG. 9 depicts the tangential orientation of holes 77, 77*a* through a cylindrical rim portion of vortex generator 20. Alternating holes 77 are formed at approximately 90° displacement from one another, with holes 77*a* interspersed centrally therebetween. In addition, holes 77 are positioned further from the discharge end of the torch so as to impinge their gas flow on angular wall 79 of anode 12 and be deflected forwardly thereby. Holes 77*a* are closer to the discharge end of torch body 10 and the gas flow therefrom is disturbed by crossing the deflected flow from the alternate holes 77.

As the electric arc originates within bore 80*b* of anode 12, the point of arc attachment within the torch is regulated according to the flow rate of gas G. The depth of bore 80*b* is sufficient to permit the attachment point of the rear electrode to be always on the cylindrical side wall of bore 80*b*, rather than on the internal end 80*c*. For optimum plasma gas flow and flame operation, it is preferred that the ratio of the length to the diameter of bore 80*b* is equal to or less than 4.

Figure 6:
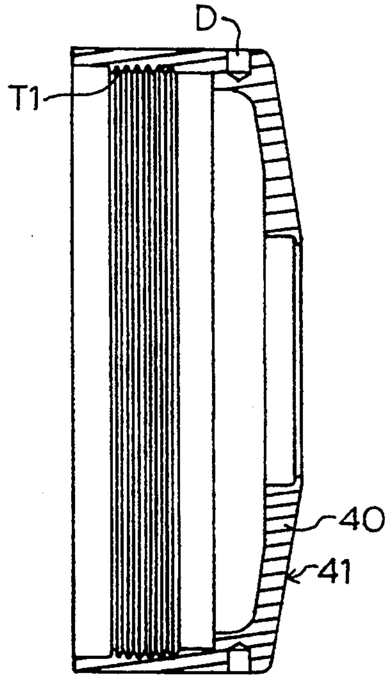
FIG. 6 is a cross sectional view of the transfer mode torch end cap of the invention.

End cap 40 is shown in cross section in FIG. 6 apart from torch body 10. End cap 40 mounts securely to torch body 10 (shown in FIG. 5B) by screw threads T1 and seals against O-rings 90, 91. Even though cathode 30 is not electrically operative in the transfer arc mode, the heated plasma gas will tend to act as an electrical conductor. When the heated plasma gas becomes electrically conductive, the associated electrical arc is free to attach at a second end to cathode base 30 rather than to the intended external workpiece. Accordingly, outer face 41 of end cap 40 and the outer face 31 of associated cathode base 30 are made convexly conical in contour, which it has been found, tends to discourage arc attachment thereto. The portion of bore 80 in cathode base 30 adjacent its outer face 31 is flared to an increased diameter as previously mentioned so as to provide a smooth expansion which has also been found to minimize plasma flame distortion and enhance heat transfer to the workpiece in the transfer arc mode.

To modify the operation of the torch from a transfer arc mode to a non-transfer arc mode, end cap 40 (FIG. 5B) is removed and cathode extension assembly 70 (FIGS. 5C and 7) is attached in its place. Cathode base 30, incorporating bore 80, remains with torch body 10 through the transition as also do the gap insulator 22, housing adapter 27 and cathode base flow guide 28, thus requiring minimal exchange of components. Cathode extension assembly 70 (illustrated separately in FIG. 7) is made up of components designed and configured to not transfer the plasma arc and to conduct coolant C therethrough so as to keep the torch parts from being damaged or possibly melted by the heat generated. A forward electrode, cathode extension 82, together with the associated threadably secured housing extension 86 and cathode flow guide extension 84 form the cathode extension assembly 70 which is adapted to thread onto torch body 10 by means of threads T1. Wrench sockets D in end cap 40 (FIG. 6) and wrench sockets D in cathode extension 82 (FIG. 7) are provided to enable removal and attachment of these components. Cathode extension 82 has a central bore 80*a* similar in diameter to the outer, flared discharge end of bore 80 of cathode base 30 and is assembled so as to be concentric therewith and establish electrical and thermal contact therewith. Cathode extension 82 has a substantially planar outer face 83 at the arc discharge end of the extended plasma torch. Cathode flow guide extension 84 fits concentrically within cathode extension 82 retaining a circumfrential gap therebetween and has a plurality of circumferentially spaced stand-off pegs S to maintain a gap for coolant flow. A housing extension 86 spans the space from cathode extension 82 to housing adapter 27.

As described above, the design of using two smaller parts, i.e. housing extension 86 and cathode extension 82, provides relatively small parts so as to be readily replaced when needed.

Continuing with reference to FIG. 5C, as coolant C exits the passage 66 through cathode base 30, a protrusion 84a of cathode flow guide extension 84, including O-ring 92, engages cathode base flow guide 28, thereby causing coolant C to flow through channel 88 around cathode flow guide extension 84 in cathode assembly 70 and then into channel 68 (FIG. 5B) to be discharged as previously described.

When the plasma torch is energized in the non-transferred arc mode with cathode assembly 70 attached, as plasma gas G flows out of central bore 80 and its continuation bore 80*a* in the center of cathode extension 82, both anode 12 and cathode base 30/cathode extension 82 are energized to cause an arc to follow gas G out the end of bore 80*a* and double back to attach itself electrically to cathode extension face 83, causing high heat energy to be generated from the electric energy supplied.

Figure 7:
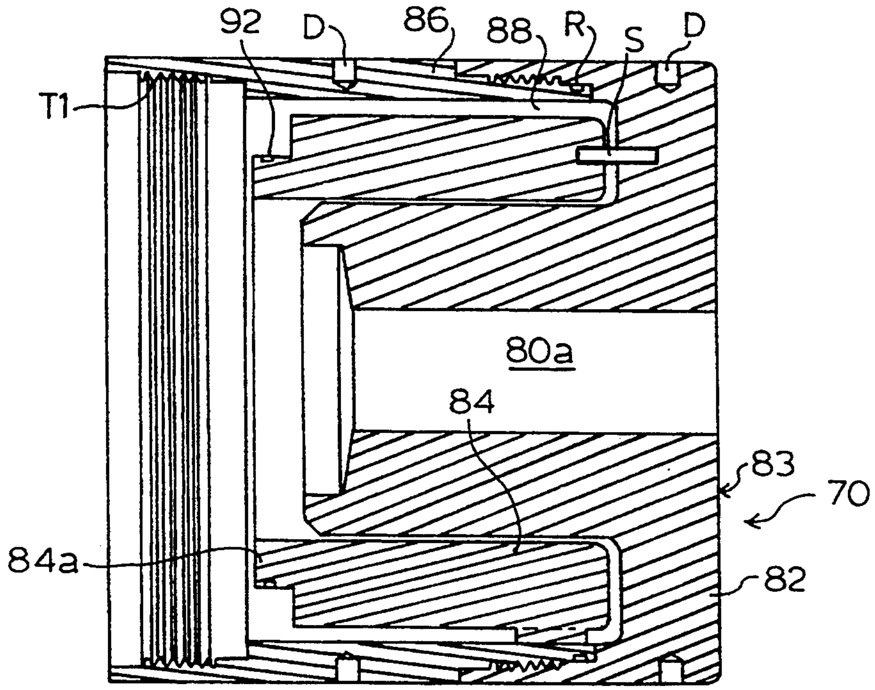
FIG. 7 is a cross sectional view of the non-transfer mode torch cathode extension assembly of the invention.

A particular feature of the invention is the configuration of the face 83 of cathode extension 82 as shown in FIGS. 5C and 7. With flat cathode face 83, as in the preferred embodiment, the electric arc formed along plasma gas G will find a suitable place at which to attach itself back to cathode extension 82. The attachment point typically is adjacent the bore 80*a* at the beginning of torch use. As the electric current gradually erodes surface 83 of cathode extension 82 in the vicinity of the initial attachment point, a new attachment point, further from center, is contacted by virtue of then being more prominent than the initial eroded position. In this way, rather than being confined, the arc finds its natural position and thereby increases the attainable service life of the cathode extension 82 before replacement is required.

Figure 8:
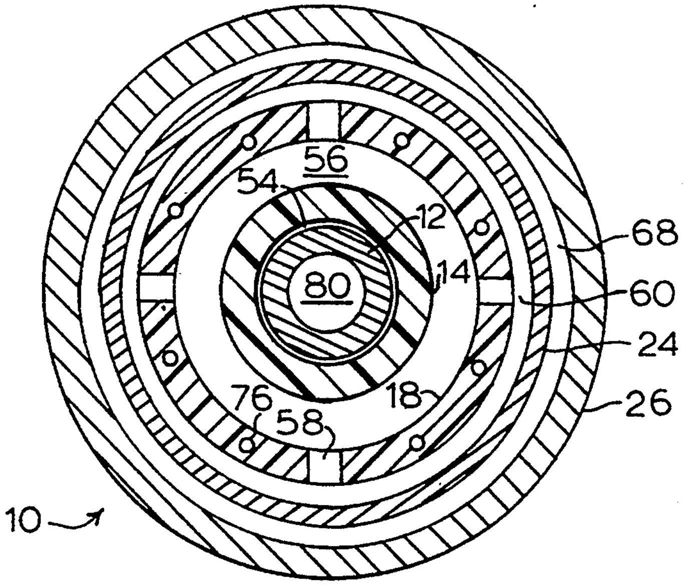
FIG. 8 is a cross sectional view of the plasma torch of the invention taken in the direction of line 8—8 of FIG. 5B.

The illustration of FIG. 8 shows a cross section of the torch body 10 of the plasma arc torch in a section taken in the direction of line 8—8 of FIG. 5B and indicating a number of coolant and gas flow passages. Initially, coolant water C travels in channel 54 toward the discharge end of the plasma torch. Coolant C is reversed in direction to travel away from the discharge end through channel 56. Coolant C next moves radially outward from the center of torch body 10 through passages 58 and back toward the discharge end in channel 60. In a final reversing of direction, coolant water C travels back in channel 68. This intricate flow pattern of coolant serves to provide adequate coolant to contact all parts of the plasma torch to minimize heat damage.

The gas G flow merely moves from entry end to flame discharge end in a single pass as described above. However, it is recognized that the gas absorbs heat from the parts of torch body 10 with which it is in contact, thus acting as a further cooling agent. Gas G enters the body 10 of the torch and travels through channel 74 (FIG. 5*a*) and continues into passages 76 which are drilled into barrier 18. The balance of the movement of gas G is described in the description of FIG. 5B above.

Thus, removal of end cap 40 by unscrewing, and replacement with cathode extension assembly 70 changes the operative mode of the plasma arc torch from transfer mode to non-transfer mode. A housing extension 86 joins torch body 10 to cathode extension assembly 70. The use of matching threaded connections and sealing O-rings between sections allows the modification not only of the plasma arc operating mode, but simultaneously of the coolant C path to flow through and cool cathode extension assembly 70.

According to the preferred embodiment, anode 12, cathode base 30, cathode extension 82 and end cap 40, are preferably fabricated of copper. Anode liner 14 and barrier 18 are preferably made of Delrin ® plastic resin from E. I. dupont De Nemours & Co., Inc. Vortex generator 20 and gap insulator 22 are preferably fabricated of a thermally insulating ceramic, such as a composite glass-bonded mica ceramic material having a thermal rating of 1100° F. The balance of the components, with the exception of the O-rings, are preferably either made of 410 grade stainless steel or of brass, depending on considerations of fabrication cost and part durability.

As described above, the operation of a plasma arc torch involves electrical energy capable of forming an electrical arc along a flow of plasma gas. Anode 12 is utilized as a front electrode during torch operation in either mode. When operated in the transfer mode as shown in FIG. 5, cathode base 30 is not operative, and the workpiece is suitably electrically connected so as to comprise a front electrode to be heated. When operated in the non-transfer mode and including cathode extension assembly 70, cathode base 30 connects electrically to cathode extension 82 which is energized so that the electric arc follows the plasma gas G flow out from vortex chamber 78 through bore 80, 80*a* and returns to attach to face 83 of cathode extension 82. The appropriate electrical connections will be well understood and are therefore not illustrated to simplify the drawings.

In summary, the plasma arc torch of the invention comprises a cylindrical torch body section including a cylindrical hollow rear electrode mounted coaxially therewith and extending lengthwise of the body section. There is a tubular base member assembled forward of the rear electrode with a central bore and an annular mounting member. When operable in a transfer arc mode, an end cap is mounted removeably to the mounting member, and, alternatively, in the transfer arc mode, an extension member is similarly mounted. Coolant circulation means are provided first within the torch body portion, second within the end cap, when mounted, and third within the extension member, when mounted.

It is to be understood that the details of the preferred embodiment are not considered limitations on the scope and principles of the invention, as various modifications will be apparent to those skilled in the art.

What is claimed is:

1. A plasma arc torch capable of being assembled for operation in either a transfer arc mode or a non-transfer arc mode, and comprising:
   - (a) a torch body;
   - (b) a hollow rear electrode fixedly mounted within said torch body;
   - (c) first coolant passageways within said torch body operative in conjunction with a coolant to cool both said rear electrode and components within said torch body associated with said rear electrode;

- (d) an electrode base member mounted on said torch body forward of said rear electrode and having a bore serviceable in a transfer arc mode as a collimator and in a non-transfer arc mode as a portion of a front electrode;
   - (e) a mounting member positioned radially outwardly of said base member and secured to said torch body at a forward end thereof and providing releasable securing means thereon;
   - (f) an end cap member formed with an outer face shaped to enhance transfer arc mode operation of said plasma torch, said end cap member removably securable to said securing means and when so secured, being in operative association with said base member providing a collimating structure within said plasma arc torch when operating in a transfer arc mode;
   - (g) second coolant passageways operatively connected with said first coolant passageways when said end cap member is mounted on said securing means to provide passageways operative in conjunction with a coolant to cool said end cap member, said base member and other torch components operatively associated therewith;
   - (h) an electrode extension member having an outer face shaped to promote arc attachment thereto and removably securable to said securing means in a manner whereby an inner rearward portion of said electrode extension member is connected both thermally and electrically to a forward portion of said electrode base member so as to provide a front electrode structure for said plasma arc torch when operating in a non-transfer arc mode and having a bore aligned with the bore of said base member;
   - (i) third coolant passageways adapted to operatively connect with said first coolant passageways when said electrode extension member is mounted on said securing means to provide passageways operative in conjunction with a coolant to cool said electrode extension member, said base member and other components operatively associated therewith; and
   - (j) whereby either said end cap member or said electrode extension member may be mounted by said securing means to said torch body without replacing said electrode base member so that the torch may operate in a transfer arc mode or in a non-transfer arc mode respectively.

2. A plasma arc torch, comprising:
   - (a) a plasma torch body having channels some of which are adapted to carry a plasma gas and others of which are adapted to carry a coolant;
   - (b) a hollow rear electrode mounted within said torch body;
   - (c) a cathode base fixed within said body;
   - (d) an end cap mountable on said plasma torch body and formed such that when said end cap is removed from said torch body said plasma gas and coolant channels within said body are exposed;
   - (e) a cathode extension assembly mountable on said plasma torch body and adapted to replace said end cap when converting the plasma torch from a transfer arc mode to a non-transfer arc mode; and
   - (f) said cathode extension assembly being placed in electrical contact with said fixed cathode base when attached to said torch body in place of said end cap and having extension channels located so as to mate with and effectively extend said exposed plasma gas and coolant channels within said torch body thereby providing an extended path for said coolant and said plasma gas.

* * * * *

UNITED STATES PATENT AND TRADEMARK OFFICE

CERTIFICATE OF CORRECTION

PATENT NO. : 5,451,740

DATED : September 19, 1995

INVENTOR(S) : Gary J. Hanus, et al.

It is certified that error appears in the above-indentified patent and that said Letters Patent is hereby corrected as shown below:

Column 1, line 17, correct "neat" to read --heat--.

Column 2, line 36, correct "snowing" to read --showing--.

Column 2, line 42, correct "snowing" to read --showing--.

Signed and Sealed this

Fifth Day of December, 1995

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO. : 5,451,740

DATED : September 19, 1995

INVENTOR(S) : Gary J. Hanus et al.

It is certified that error appears in the above-indentified patent and that said Letters Patent is hereby corrected as shown below:

On the title page, under

[.] Notice: "The portion of the term of this patent subsequent to Nov. 8, 2011 has been disclaimed." to read --The portion of the term of this patent subsequent to Dec. 1, 2013 has been disclaimed.--

Signed and Sealed this

Ninth Day of January, 1996

Attest:

BRUCE LEHMAN

*Attesting Officer* *Commissioner of Patents and Trademarks*